United States Patent
Drogichen et al.

(10) Patent No.: US 7,225,363 B2
(45) Date of Patent: May 29, 2007

(54) METHOD AND APPARATUS FOR ABANDONING AN INTERRUPTED TASK

(75) Inventors: Daniel P. Drogichen, Leucadia, CA (US); Eric E. Graf, Hillsboro, OR (US); James A. Gilbert, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 486 days.

(21) Appl. No.: 10/100,536

(22) Filed: Mar. 18, 2002

(65) Prior Publication Data
US 2003/0177346 A1 Sep. 18, 2003

(51) Int. Cl.
*G06F 11/00* (2006.01)
(52) U.S. Cl. .......................... 714/39; 714/36
(58) Field of Classification Search ................ 713/100; 714/15, 36, 39
See application file for complete search history.

(56) References Cited

U.S. PATENT DOCUMENTS

| | | | |
|---|---|---|---|
| 5,097,413 A | | 3/1992 | Mensch, Jr. |
| 5,263,168 A | * | 11/1993 | Toms et al. ............... 713/1 |
| 5,579,522 A | * | 11/1996 | Christeson et al. ........... 713/2 |
| 5,727,207 A | * | 3/1998 | Gates et al. ............... 713/1 |
| 6,272,626 B1 | * | 8/2001 | Cobbett ................... 713/2 |
| 6,507,906 B1 | * | 1/2003 | Criddle et al. ............. 713/2 |
| 6,681,390 B2 | * | 1/2004 | Fiske ..................... 717/173 |
| 6,820,197 B2 | * | 11/2004 | Benedix et al. ............ 713/1 |
| 6,857,065 B2 | * | 2/2005 | Blaner et al. ............. 713/1 |
| 2002/0162052 A1 | * | 10/2002 | Lewis .................... 714/36 |

* cited by examiner

*Primary Examiner*—Michael C. Maskulinski
(74) *Attorney, Agent, or Firm*—Meyertons Hood Kivlin Kowert & Goetzel, P.C.; B. Noël Kivlin

(57) ABSTRACT

A method and apparatus for abandoning an interrupted task is provided. The method includes setting at least one of a plurality of logic elements associated with at least one of a plurality of first registers, wherein the plurality of first registers are adapted to access data stored in a plurality of second registers at substantially the same time when the plurality of logic elements are set. The method further includes resetting the plurality of logic elements substantially before the plurality of first registers access the data stored in the plurality of second registers.

31 Claims, 8 Drawing Sheets

METHOD AND APPARATUS FOR ABANDONING AN INTERRUPTED TASK

BACKGROUND OF THE INVENTION

1. Field of the Invention

This invention relates generally to processor-based systems, and, more particularly, to abandoning an interrupted task in processor-based systems.

2. Description of the Related Art

Businesses may use processor-based systems to perform a variety of tasks. These tasks may include, but are not limited to, developing new software, maintaining databases of information related to operations and management, and hosting a web server that may facilitate communications with customers. To handle such a wide range of tasks, businesses may employ a processor-based system used in a network-centric environment. One example of a processor-based system used in a network-centric environment is a mid-range server system. A single mid-range server system may have a plurality of system boards that may, for example, contain one or more processors and one or more cache memory elements that store copies of frequently used data in close proximity to the one or more processors to provide the one or more processors with faster access to the data. The one or more processors may also include one or more associated memory elements that may store larger blocks of data.

The plurality of system boards in the mid-range server system may be configured as one or more domains, where a domain, for example, may act as a separate machine by running its own instance of an operating system to perform one or more of the configured tasks. For example, one domain may be configured as a web server, another as a database server, and a third as a network server. The demands on the different domains may change over time and thus the configuration of the various domains may be altered to make more efficient use of the available resources. For example, if the number of users attempting to access the web server declines, system boards may be removed from the web domain and added to another domain, such as the domain that supports the database server. As a part of the reconfiguration process, one or more configuration registers in the domains may be updated in a serial manner.

The reconfiguration process may occasionally be interrupted. For example, an error or other undesirable event may occur after a first portion of the registers has been updated, but before the reconfiguration is complete. For another example, a user may decide that it may be desirable to abort before the reconfiguration process is complete. If configuration data has been provided to the first portion of the registers, interrupting the process may leave the system in an incoherent state wherein the first portion of the registers may be in one configuration state and a second portion of the registers may be in a second configuration state. The system may not be able to operate in the incoherent state and may crash.

The chance that the system may enter an incoherent state may be reduced by returning the configuration registers to their pre-reconfiguration state in a controlled manner. However, traditional methods of returning the configuration registers to their pre-reconfiguration state may consume extensive system resources. For example, each time new data is written to the configuration register, essentially all of the new data may also be copied to a separate memory location. If an error, an operator abort, or similar event interrupts the reconfiguration process, the system may be returned to the pre-reconfiguration state by rewriting the stored copy of the data to the portion of the configuration registers that may have been updated. Since errors or other undesirable events are generally less common than reconfigurations, copying essentially all of the data in the configuration registers to a separate memory location before every reconfiguration may be an undesirable expenditure of resources and may decrease the efficiency of the system.

SUMMARY OF THE INVENTION

In one aspect of the instant invention, an apparatus is provided for abandoning an interrupted task. The apparatus includes a plurality of serial registers and a plurality of logic elements associated with the serial registers. The apparatus further includes a plurality of parallel registers, wherein the parallel registers are adapted to access the plurality of serial registers at substantially the same time in response to a synchronization signal when the associated logic element is set, and a controller adapted to reset the logic element in response to detecting an event.

In one aspect of the present invention, a method is provided for abandoning an interrupted task. The method includes setting at least one of a plurality of logic elements associated with at least one of a plurality of first registers, wherein the plurality of first registers are adapted to access data stored in a plurality of second registers at substantially the same time when the plurality of logic elements are set. The method further includes resetting the plurality of logic elements substantially before the plurality of first registers access the data stored in the plurality of second registers.

BRIEF DESCRIPTION OF THE DRAWINGS

The invention may be understood by reference to the following description taken in conjunction with the accompanying drawings, in which like reference numerals identify like elements, and in which.

Figure 1:
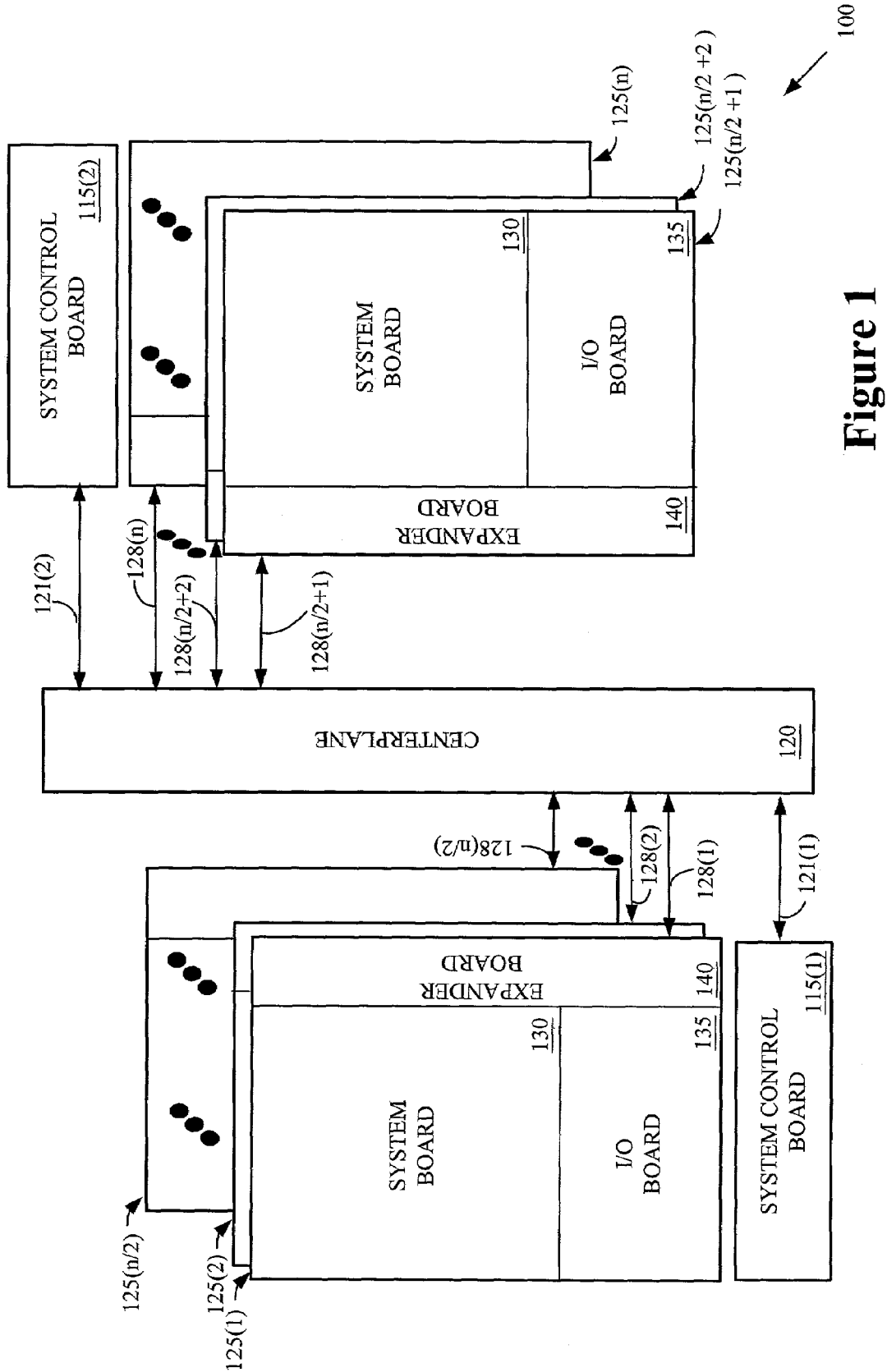
FIG. 1 shows a block diagram of a system, in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to FIG. 1, a block diagram of a system 100 in accordance with one embodiment of the present invention is illustrated. The system 100, in one embodiment, includes a plurality of system control boards 115(1–2) that are coupled to a centerplane 120. For illustrative purposes, lines 121(1–2) are utilized to show that the system control boards 115(1–2) are coupled to the centerplane 120, although it should be appreciated that, in other embodiments, the system control boards 115(1–2) may be coupled to the centerplane 120 in any of a variety of ways, including by edge connectors, cables, or other available interfaces.

In the illustrated embodiment, the system 100 includes two system control boards 115(1–2), one for managing the overall operation of the system 100 and the other to provide redundancy and automatic failover in the event that the other board fails. Although not so limited, in the illustrated embodiment, the first system control board 115(1) serves as a "main" system control board, while the second system control board 115(2) serves as an alternate replaceable system control board. In one embodiment, during any given moment, generally one of the two system control boards 115(1–2) actively controls the overall operations of the system 100.

The system 100, in one embodiment, includes a plurality of system board sets 125(1–n) that are coupled to the centerplane 120, as indicated by lines 128(1–n). The system board sets 125(1–n) may be coupled to the centerplane 120 in one of several ways, including edge connectors or other available interfaces. The centerplane 120 may serve as a communications conduit for the plurality of system board sets 125(1–n), half of which may be connected on one side of the centerplane 120 and the other half on the opposite side of the centerplane 120. The centerplane 120, in one embodiment, may provide one or more communication pathways that allow the system board sets 125(1–n) and the system control boards 115(1–2) to communicate, if desired. Thus, the centerplane 120 may allow the two system control boards 115(1–2) to communicate with each other or with other system board sets 125(1–n), as well as allow the system board sets 125(1–n) to communicate with each other.

The system board sets 125(1–n), in one embodiment, comprise one or more boards, including a system board 130, an I/O board 135, and an expander board 140. The system board 130 may include processors and memories for executing applications, including portions of an operating system. The I/O board 135 may manage I/O cards, such as peripheral component interface cards and optical cards, which are installed in the system 100. The expander board 140, in one embodiment, generally acts as a multiplexer (e.g., 2:1 multiplexer) to allow both the system and I/O boards 130, 135 to interface with the centerplane 120, which, in some instances, may have only one slot for interfacing with both boards 130, 135. In one embodiment, the system board 130 and the I/O board 135 may, separately or in combination with the expander board 140, be removed from the system 100 by decoupling one or more of the boards 130, 135 from their respective interface slots.

In one embodiment, the system 100 may be dynamically subdivided into a plurality of domains, where each domain may have a separate boot disk (to execute a specific instance of the operating system, for example), separate disk storage, network interfaces, and/or I/O interfaces. Each domain, for example, may operate as a separate machine that performs a variety of user-configured services. For example, one or more domains may be designated as an application server, a web server, database server, and the like. In one embodiment, each domain may run its own operating system (e.g., Solaris operating system).

The plurality of domains in the system 100 may be dynamically reconfigured while the system 100 is in operation without necessarily interrupting the operation of other domains. For example, the domain running the database server may be dynamically reconfigured without substantially affecting the function of the domain running the web server. Dynamic reconfiguration may, in one embodiment, comprise removing one or more system board sets 125(1–n), or other system assets such as the system board 130 or the I/O board 135, from a domain; adding one or more system board sets 125(1–n), or other system assets such as the system board 130 or the I/O board 135, to a domain; or a combination thereof.

To dynamically reconfigure the system 100, the system control board 115(1–2) may provide configuration data to a plurality of registers on a variety of application specific integrated circuits (ASICs) in the centerplane 120 and on the expander board 140. Providing the configuration data to the registers may include such actions as providing the configuration data to the centerplane 120, the expander board 140, and the like. In one embodiment, the registers may be shift registers connected in series, in which case accessing the registers may include serially shifting bits into and out of the registers. An associated logic element may be set as each register receives the updated data. It should, however, be appreciated that any desirable register may be used without departing from the scope of the present invention.

Once the configuration data has been provided to substantially all of the plurality of registers awaiting reconfiguration, the plurality of registers associated with a set logic element may then substantially simultaneously provide the configuration data to one or more configuration registers on the one or more ASICs in response to a synchronization signal provided by the system control boards 115(1–2).

However, the dynamic reconfiguration process may be interrupted. In one embodiment, errors or other undesirable events may occur substantially after a first portion of the configuration data may have been provided to the plurality of registers and substantially before a second portion of the configuration data has been provided to the plurality of registers. Similarly, a system administrator or other user may determine that it may be desirable to abandon the reconfiguration process substantially after the first portion of the configuration data may have been provided to the plurality of registers and substantially before the second portion of the configuration data has been provided to the plurality of registers.

Simply interrupting the reconfiguration process may not be desirable. For example, if configuration data has been provided to the first portion of the registers, interrupting the process may leave the system 100 in an incoherent state wherein a first portion of the registers may be in one configuration state and a second portion of the registers may be in a second configuration state. The system 100 may not be able to operate in the incoherent state and may crash. To reduce the chance that the system 100 may enter an incoherent state, it may be desirable to restore the registers to their previous state. Thus, in accordance with one or more embodiments of the present invention, and as will be described in more detail below, a method and apparatus for abandoning the reconfiguration process in a controlled manner may be provided.

Figure 2:
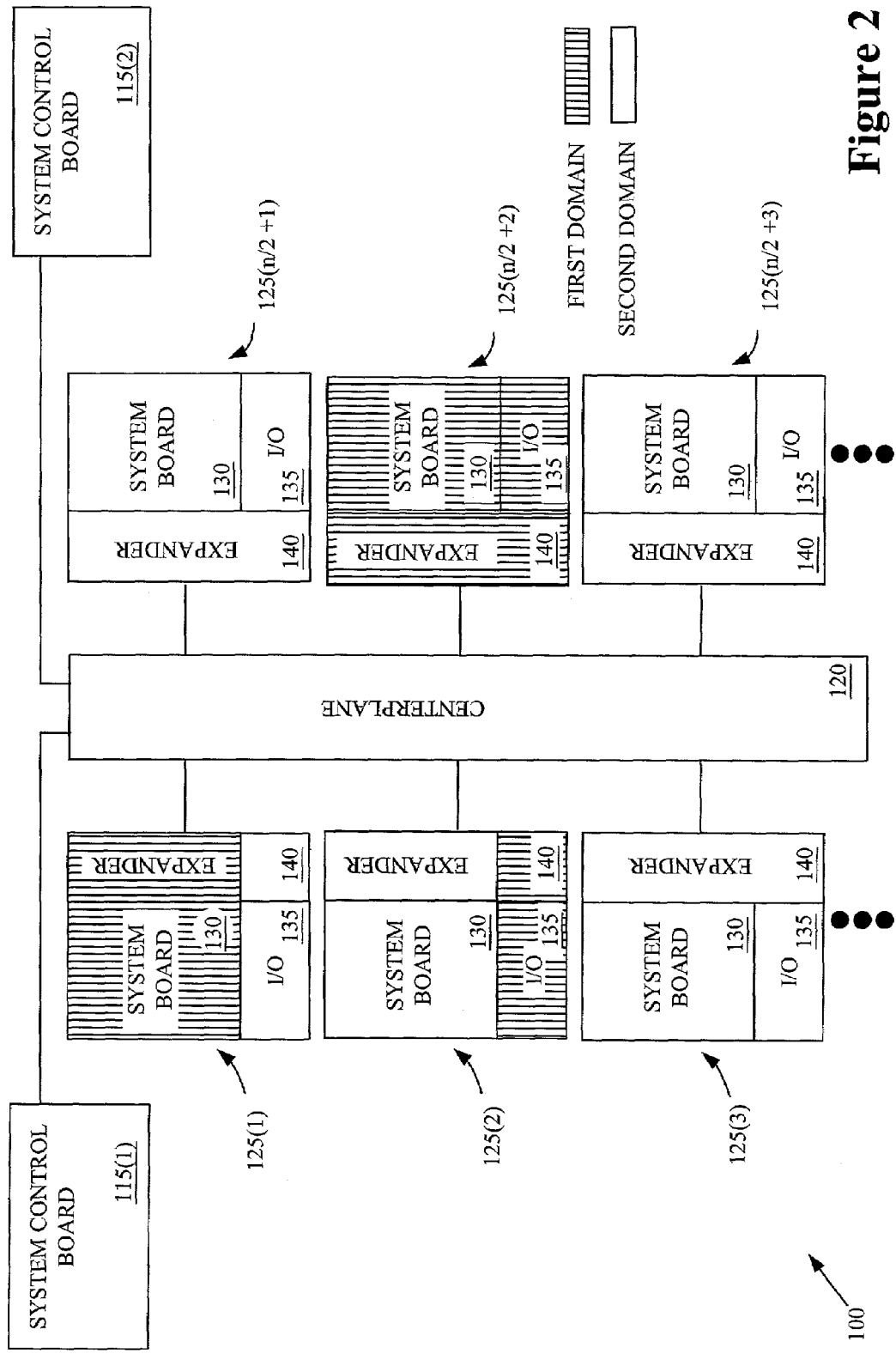
FIG. 2 illustrates a block diagram of an exemplary domain configuration that may be employed in the system of FIG. 1, in accordance with one embodiment of the present invention.

FIG. 2 illustrates an exemplary arrangement where at least two domains are defined in the system 100. The first domain, identified by vertical cross-sectional lines, includes the system board set 125(n/2+2), the system board 130 of the system board set 125(1), and the I/O board 135 of the system board set 125(2). The second domain in the illustrated embodiment includes the system board sets 125(3), 125(n/2+1), and 125(n/2+3), as well as the I/O board 135 of the system board set 125(1) and the system board 130 of the system board set 125(2).

As shown, a domain may be formed of an entire system board set 125(1–n), one or more boards (e.g., system board 130, I/O board 135) from selected system board sets 125(1–n), or a combination thereof. Although not necessary, it may be possible to define each system board set 125(1–n) as a separate domain. For example, if each system board set 125(1–n) were its own domain, the system 100 may conceivably have up to "n" (i.e., the number of system board sets) different domains. When two boards (e.g., system board 130, I/O board 135) from the same system board set 125(1–n) are in different domains, such a configuration is referred to as a "split expander." When used as a split expander, the expander board 140 of the system board sets 125(1–n), in one embodiment, keeps the transactions for the system board 130 in one domain separate from the transactions for the I/O board 135 in another domain. No physical proximity may be needed for boards in a domain.

Figure 3:
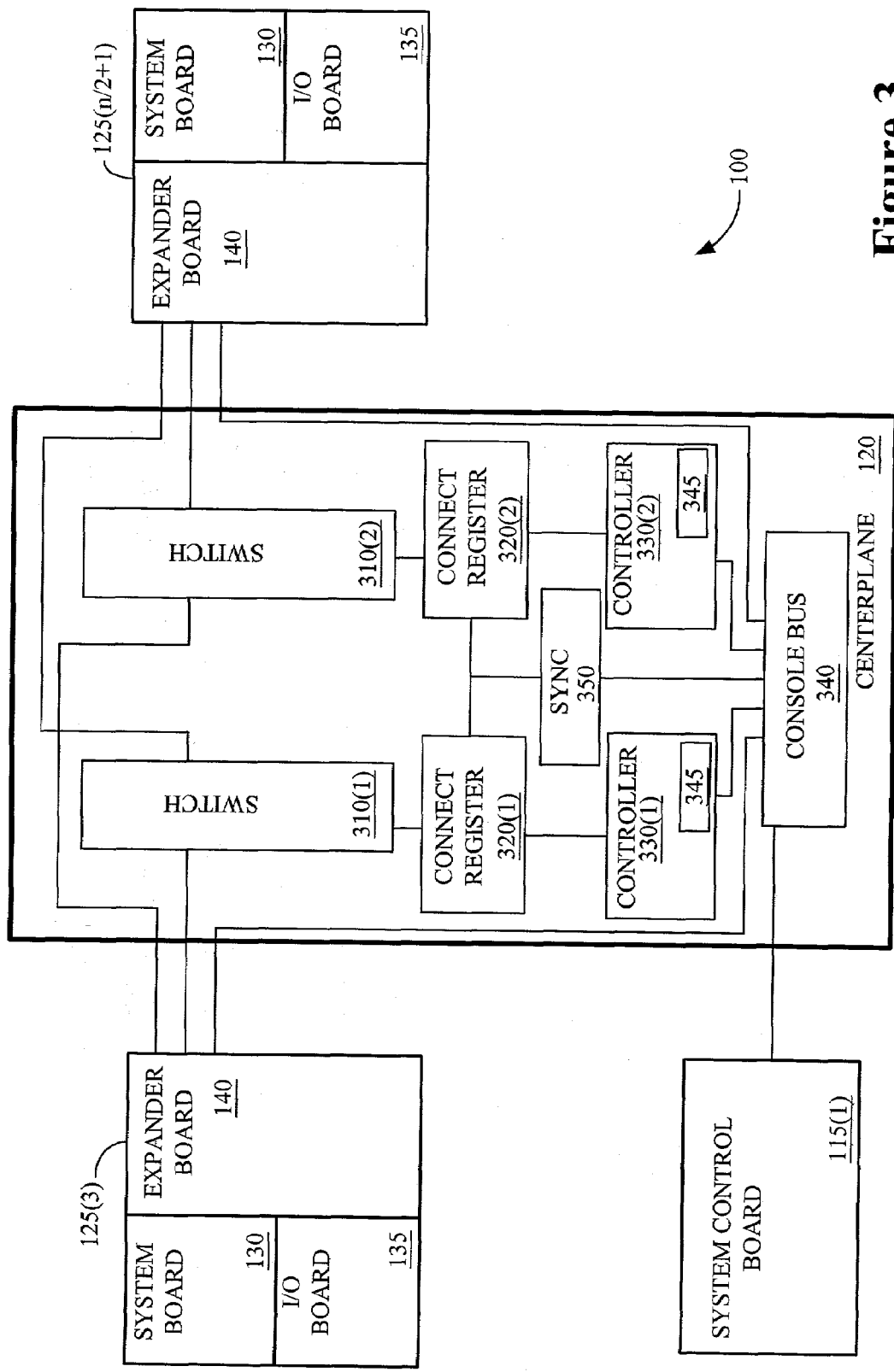
FIG. 3 shows a block diagram of a centerplane that may be used in the system of FIG. 1, in accordance with one embodiment of the present invention.

FIG. 3 shows a more detailed block diagram of the centerplane 120 in the system 100. For ease of illustration, only two system board sets 125(3), 125(n/2+1) from the first domain and the system control board 115(1) are shown in this figure. In one embodiment, the system board sets 125(3), 125(n/2+1) may be coupled by one or more switches 310(1–2) in the centerplane 120. The switches 310(1–2) may include separate pathways for transmitting respective data, address, and control signals provided from the expander board 140 of the system board sets 125(1–n). Thus, in one embodiment, the switches 310(1–2) may include three 18×18 crossbar switches that provide a separate data path, address path, and control signal path to allow intra- and inter-domain communications. Using separate paths for data, addresses, and control signals, in one embodiment, may reduce the interference among data traffic, address traffic, and control signal traffic. Pairs of system board sets (e.g. 125(3) and 125(n/2+1)) may use either switch 310(1–2) to transmit signals and, in the event that one of the switches 310(1–2) becomes substantially unable to form the desired communication link, the system board sets 125(3), 125(n/2+1) may use the remaining switch 310(1–2). In one embodiment, the switches 310(1–2) may provide a bandwidth of about 43 Gigabytes per second. In other embodiments, a higher or lower bandwidth may be achieved using the switch 310(1–2).

The one or more switches 310(1–2) may be coupled to one or more connect registers 320(1–2), which may store configuration data that may be used by the one or more switches 310(1–2) to determine the allowed intra-domain and inter-domain connections. In one embodiment, the connect registers 320(1–2) may include a plurality of logic elements (not shown) corresponding to the possible communication links between pairs of system board sets 125(1–n). For example, if the system 100 contains n=18 system board sets 125(1–18), the connect registers 320(1–2) may be an n×n=18×18=324-bit register. The logic elements may contain information that may be used to indicate whether the connection link is an intra-domain connection or an inter-domain connection. For example, in FIG. 3, the system board sets 125(3), 125(n/2+1) are both in the first domain, so the appropriate logic element in the connect registers 320(1–2) would be set to indicate that an intra-domain communication link between the system board sets 125(3), 125(n/2+1) is allowed. In alternative embodiments, the connect registers 320(1–2) may store additional information that may allow for a split expander 140, as described above.

As will be described in more detail below, during dynamic reconfiguration the system control board 115(1) may provide configuration data to one or more controllers 330(1–2) via a console bus 340. Although not so limited, in one embodiment, the console bus 340 may be an 8-bit parallel bus. In alternative embodiments, an Inter-IC (I2C) serial bus, a PCI bus, or any other standard or proprietary serial or parallel bus well known to those of ordinary skill in the art may be used to provide configuration data in the system 100. The controllers 330(1–2) may, in accordance with one embodiment of the present invention, include a detector 345 that may detect a variety of events that may make it desirable to abandon a process, as described in more detail below.

Portions of the configuration data may be serially shifted into at least one of the connect registers 320(1–2). In one embodiment, the portions of the configuration data in the connect registers 320(1–2) may be stored for a certain period of time and not used to dynamically reconfigure the connect registers 320(1–2) until a synchronization signal is detected. To provide the synchronization signal, the centerplane 120 may include at least one synchronizer 350 coupled to the console bus 340 and the connect registers 320(1–2). In one embodiment, the synchronizer 350 may be a repeater or an equivalent device well known to those of ordinary skill in the art. The synchronizer 350 may provide the synchronization signal in response to a signal broadcast by the system control board 115(1) through the console bus 340.

Figure 4:
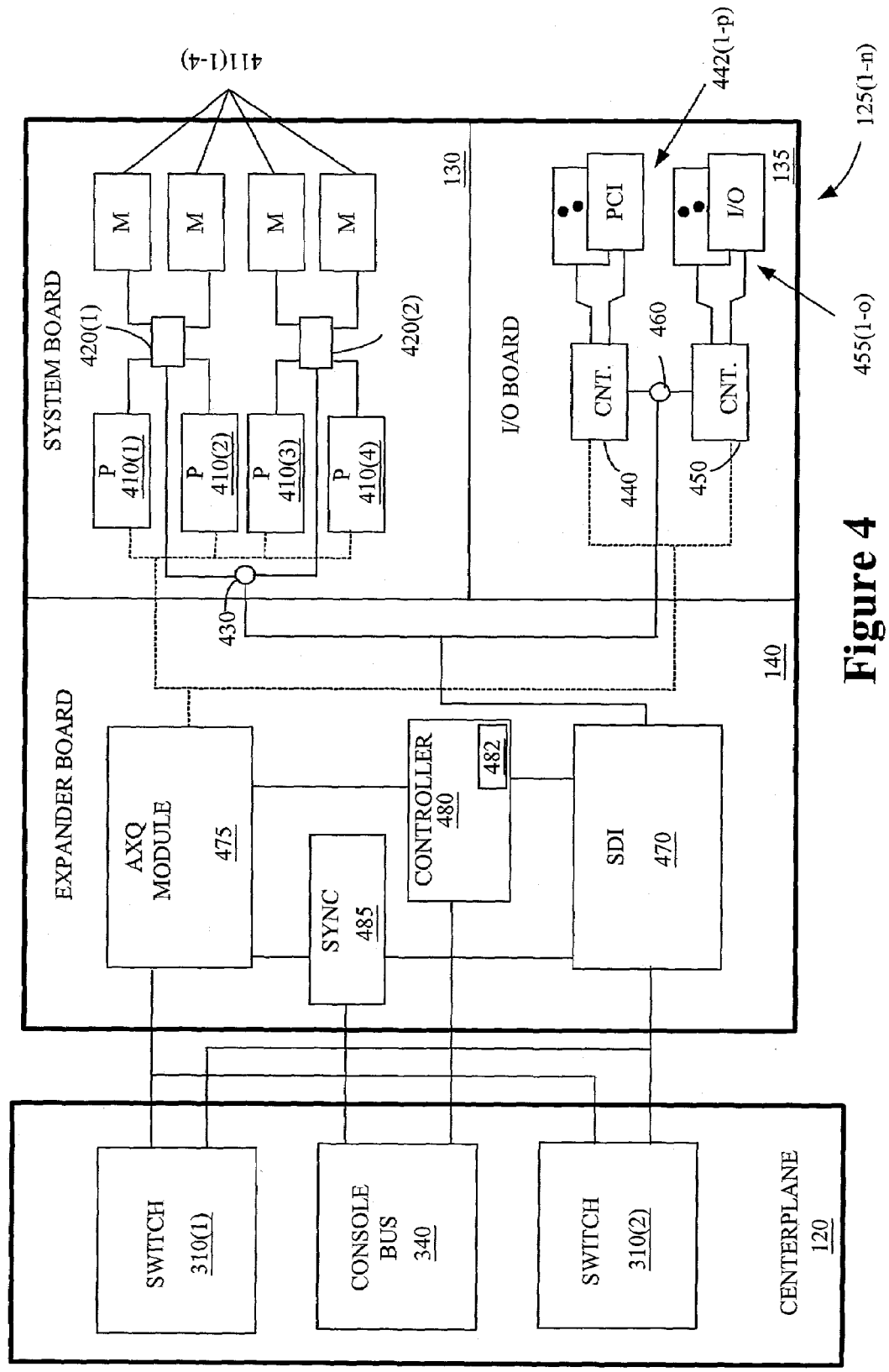
FIG. 4 depicts a block diagram of one system board set that may be employed in the system of FIG. 1, in accordance with one embodiment of the present invention.

FIG. 4 shows a block diagram of one system board set 125(1–n) that may be employed in the system 100. Although not so limited, the system board 130 of each system board set 125(1–n) in the illustrated embodiment includes four processors 410(1–4), with each of the processors 410(1–4) having an associated memory 411(1–4). The processors 410(1–4), in one embodiment, may be able to access their own associated memories 411(1–4), as well as the memories associated with other processors in the same domain. In one embodiment, a different number of processors 410(1–4) and memories 411(1–4) may be employed in any desirable combination, depending on the implementation. In one embodiment, two five-port dual data switches 420(1–2) connect the processor/memory pairs (e.g., processors 410

(1–2)/memories 411(1–2) and processors 410(3–4)/memories 411(3–4)) to a board data switch 430.

Although not so limited, the I/O board 135 of each system board set 125(1–n) in the illustrated embodiment includes a controller 440 for managing one or more of the PCI cards that may be installed in one or more PCI slots 442(1–p). In the illustrated embodiment, the I/O board 135 also includes a second controller 450 for managing one or more I/O cards that may be installed in one or more I/O slots 455(1–o). The I/O slots 455(1–o) may receive optics cards, network cards, and the like. The I/O board 135, in one embodiment, may communicate with the system control board 115(1–2) (see FIG. 1) over an internal network (not shown).

The two controllers 440, 450 of the I/O board 135, in one embodiment, are coupled to a data switch 460. A System Data Interface (SDI) 470 on the expander board 140 may receive an output signal from the data switch 460 of the I/O board 135 and from the switch 430 of the system board set 125(1–n). The SDI 470 may process data transactions to and from the switches 310(1–2) and the system and I/O boards 130 and 135. A separate address path (shown in dashed lines) is shown from the processors 410(1–4) and the controllers 440, 450 to an Address Expander Queue (AXQ) module 475. The AXQ module 475 may process address and response transactions to and from the switches 310(1–2) and the system and I/O boards 130 and 135.

The SDI 470 and the AXQ module 475 may be coupled to a controller 480. As will be described in more detail below, in one embodiment, the system control board 115(1) may provide configuration data to the controller 480 via the console bus 340. The controller 480 may, in accordance with one embodiment of the present invention, include a detector 482 that may detect a variety of events that may make it desirable to abandon a process, as described in more detail below.

Portions of the configuration data may be serially delivered to the SDI 470 and the AXQ module 475. In one embodiment, the portions of the configuration data in the SDI 470 and the AXQ module 475 may be used to dynamically reconfigure the SDI 470 and the AXQ module 475 in response to a synchronization signal, which may be provided by at least one synchronizer 485. In one embodiment, the synchronizer 485 may be a repeater or an equivalent device well known to those of ordinary skill in the art. As will be described in more detail below, the synchronizer 485 may provide the synchronization signal in response to a signal broadcast by the system control board 115(1) through the console bus 340.

Figure 5B:
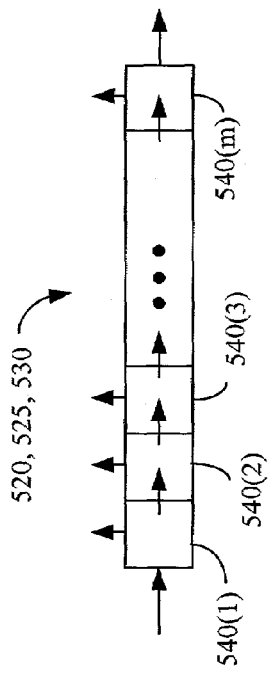
FIGS. 5A–C show a block diagram of an application specific integrated circuit (ASIC) that may be used in the centerplane of FIG. 3 or the system board set of FIG. 4, in accordance with one embodiment of the present invention.
Figure 5C:
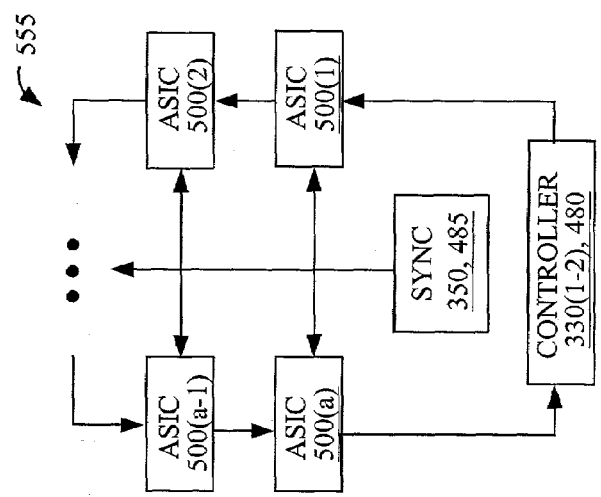
Figure 5A:
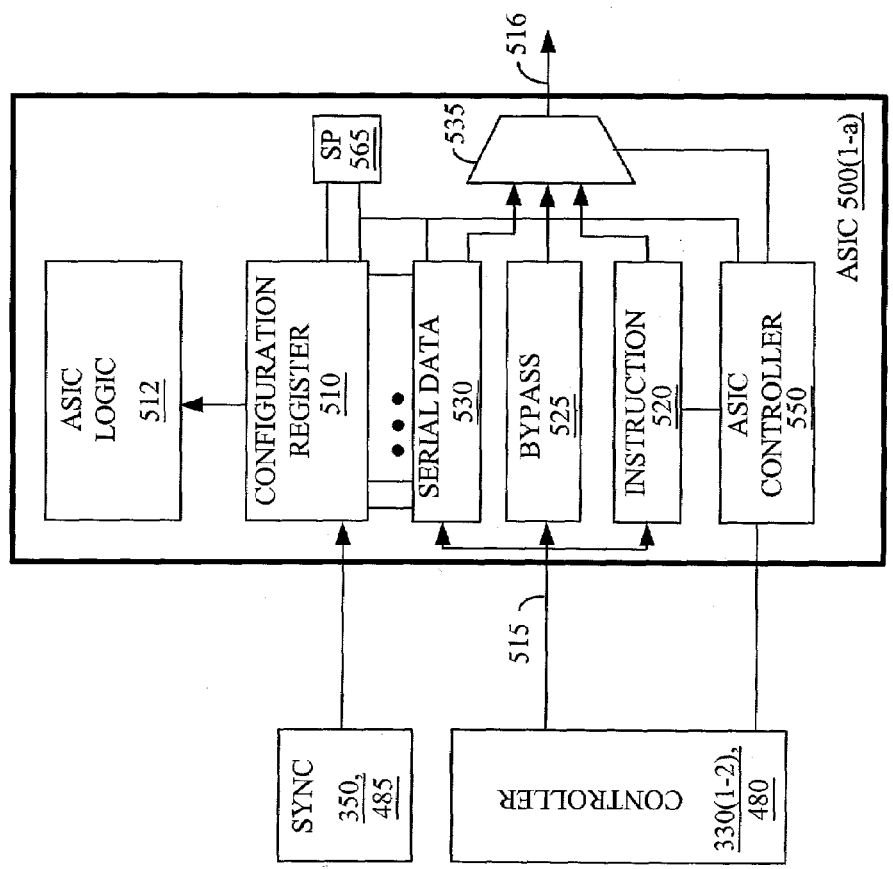

FIG. 5A shows a block diagram of an exemplary ASIC 500(1–a) that may be used to form the connect registers 320(1–2) (see FIG. 3), the SDI 470 and the AXQ module 475 (see FIG. 4), or any other desirable component of the system 100, in accordance with one embodiment of the present invention. In one embodiment, the ASIC 500(1–a) may include one or more configuration registers 510, which may store configuration data to be used by the ASIC logic 512. For example, the connect registers 320(1–2) may include the configuration register 510 storing data indicating the allowed intra-domain communication links. For another example, the AXQ module 475 may include the configuration register 510 storing addresses of elements of boards 130, 135, 140 such as processors, memory elements, and the like.

In one embodiment, the controller 330(1–2), 480 may be coupled in series to one or more ASICs 500(1–a) via a serial-in line 515 and a serial-out line 516. The serial-in line 515 may be coupled to a plurality of registers that may, in one embodiment, be deployed in parallel. Although not so limited, the registers may include one or more instruction registers 520, bypass registers 525, serial data registers 530, and the like which may be coupled to a multiplexer 535. Although one instruction register 520, one bypass register 525, and one serial data register 530 are shown in FIG. 5A, the present invention is not so limited. In alternative embodiments, any desirable number of registers may be used in the ASICs 500(1–a) without departing from the scope of the present invention.

An ASIC controller 550 may determine which register 520, 525, 530 forms the serial path through the one or more ASICs 500(1–a) by controlling the multiplexer 535. For example, the ASIC controller 550 may assert a signal that instructs the multiplexer 535 to select the channel corresponding to the bypass register 525. In that case, data may be shifted into the ASIC 500(1–a) via the serial-in line 515, through the bypass register 525, and out of the ASIC 500(1–a) via the serial-out line 516. In one embodiment, the serial-in line 515 and serial-out line 516, as well as the registers 520, 525, 530 and the ASIC controller 550, may conform to the Joint Test Action Group (JTAG) Standard, also known as the Institute of Electrical and Electronics Engineers (IEEE) Standard 1149.1, entitled "Standard test access port and boundary scan architecture." The JTAG Standard provides a serial bus standard that may be used to implement a general purpose hardware configuration, initialization, and status bus.

FIG. 5B shows one exemplary embodiment of a register that may be used to form the instruction register 520, the bypass register 525, the serial data register 530, and any other registers that it may be desirable to include in the one or more ASICs 500(1–a). The register 520, 525, 530 may include a plurality of register cells 540(1–m) that may store data. For example, each register cell 540(1–m) may store one bit. Data may be shifted serially into the register 520, 525, 530 in the direction indicated by the horizontal arrows. For example, to load a string of logic-1 bits into the instruction register 520, a first bit set to logic-1 may be shifted into the register cell 540(1). The first bit may then be shifted to the register cell 540(2) and a second bit set to logic-1 may be shifted into the register cell 540(1). The process may be repeated until the first bit has been shifted to the register cell 540(m) and all the register cells contain a bit set to logic-1. Data may also be written to, and read from, the registers 520, 525, 530 in parallel. For example, the data stored in the register cells 540(1–m) may be transmitted to a device (not shown) at substantially the same time, as indicated by the vertical arrows in FIG. 5B.

FIG. 5C shows a ring 555 including the one or more ASICs 500(1–a) that may, in one embodiment, be coupled in series to the controller 330(1–2), 480. The registers 520, 525, 530 in the ASICs 500(1–a) of the ring 555 may be accessed sequentially and so the controller 330(1–2), 480 may serially shift data into the registers 520, 525, 530. For example, in one embodiment, the controller 330(1–2), 480 may instruct an ASIC controller 550 in each of the ASICs 500(1–a) to place their respective instruction registers 520 in the serial path. The controller 330(1–2), 480 may then shift a pre-selected series of bits, hereinafter referred to as an "instruction," into the register cells 540(1–m) of each of the instruction registers 520. For example, the controller 330(1–2), 480 may shift a string of logic-1 bits, e.g. 111 . . . 1, into the register cells 540(1–m) of the instruction registers 520. The instruction may, in one embodiment, be used by the ASIC controller 550 to control the operation of the registers 525, 530.

The ASIC controller 550 may also place the serial data registers 530 in the serial path of the one or more ASICs 500(1–a) so that configuration data may be provided to the serial data register 530. In one embodiment, the configuration register 510 may be coupled in parallel to the serial data register 530. However, allowing the configuration register 510 continuous access to the serial data register 530 may not be desirable. For example, if the configuration register 510 accesses the serial data register 530 while the controllers 330(1–2), 480 are shifting data into the serial data register 530, the configuration register 510 may detect a mixture of updated data and previous data in the cells 540(1–m) of the serial data register 530. Thus, in one embodiment, the ASIC controller 550 may stop parallel data transfer between the serial data register 530 and the configuration register 510 until the controllers 330(1–2), 480 have substantially completed shifting data into serial data register 530. When the controllers 330(1–2), 480 have substantially completed shifting data into serial data register 530, the ASIC controller 550 may instruct the configuration register 510 to access the serial data register 530.

In one embodiment, configuration data may be provided to the configuration registers 510 in one or more of the plurality of ASICs 500(1–a) in the system 100 at substantially the same time in response to a synchronization signal. To provide the configuration data at substantially the same time, the controllers 330(1–2), 480 may instruct the ASIC controllers 550 in one or more of the plurality of ASICs 500(1–a) to substantially stop the parallel transfer of data from the serial data register 530 to the configuration register 510 and set a logic element (SP) 565 to indicate that the serial data register 530 may be ready to receive the synchronization signal from the synchronizer 350, 485. The ASIC controller 550 may also place the bypass register 525 in the serial path. Upon receiving the synchronization signal from the synchronizer 350, 485, the configuration registers 510 in the one or more of the plurality of ASICs 500(1–a) may access the configuration data stored in the serial data registers 530 substantially simultaneously.

Figure 6A:
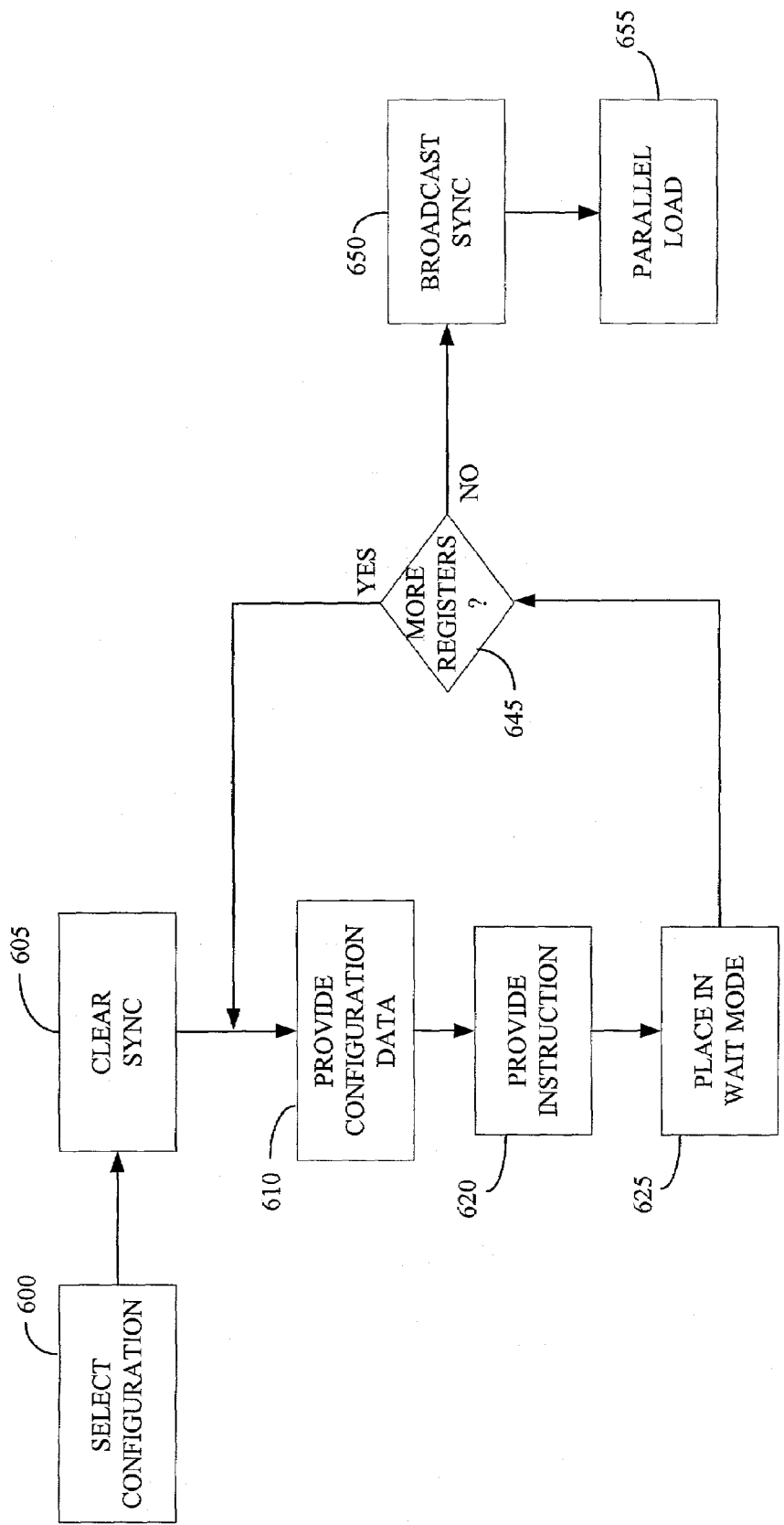
FIGS. 6A–C show a flow chart depicting a method of providing configuration data to a plurality of ASICs shown in FIG. 5, in accordance with one embodiment of the present invention.

FIG. 6A shows a flow diagram illustrating a method of providing configuration data to one or more of the plurality of ASICs 500(1–a) at substantially the same time. To dynamically reconfigure the system 100, a user, such as a system administrator, or an automated process in the system 100 may select (at 600) a configuration of the system 100. Selecting (at 600) a configuration may, in one embodiment, comprise such actions as determining which components of the system it may be desirable to remove from a domain, which components it may be desirable to add to a domain, or a combination thereof. Selecting (at 600) a configuration may also include tasks such as determining the appropriate configuration data, determining a portion of the plurality of ASICs 500(1–a) in the system 100 that may use the configuration data, and the like.

Configuration data from one or more interrupted, aborted, or otherwise pending reconfigurations may be stored in one or more of the portion of the plurality of ASICs 500(1–a) that may use the configuration data to be provided by the controllers 330(1–2), 480. Thus, in accordance with one embodiment of the present invention, the controllers 330 (1–2), 480 may provide the abandon instruction to one or more ASIC controllers 550. In response to the abandon instruction, the ASIC controllers 550 may clear (at 605) the logic element (SP) 565 and perform any other desirable operations.

The system control boards 115(1–2) may provide (at 610) the configuration data to the controllers 330(1–2), 480 via the console bus 340. In one embodiment, portions of the configuration data may be provided (at 610) sequentially to one or more selected ASICs 500(1–a) in a serial fashion and the controllers 330(1–2), 480 may shift the portions of the configuration data into the serial data registers 530 of the selected ASICs 500(1–a), as described above. The system control boards 115(1–2) may also instruct (at 620) the ASIC controller 550 to place (at 625) the ASIC 500(1–a) in a wait mode, as described below.

Figure 6C:
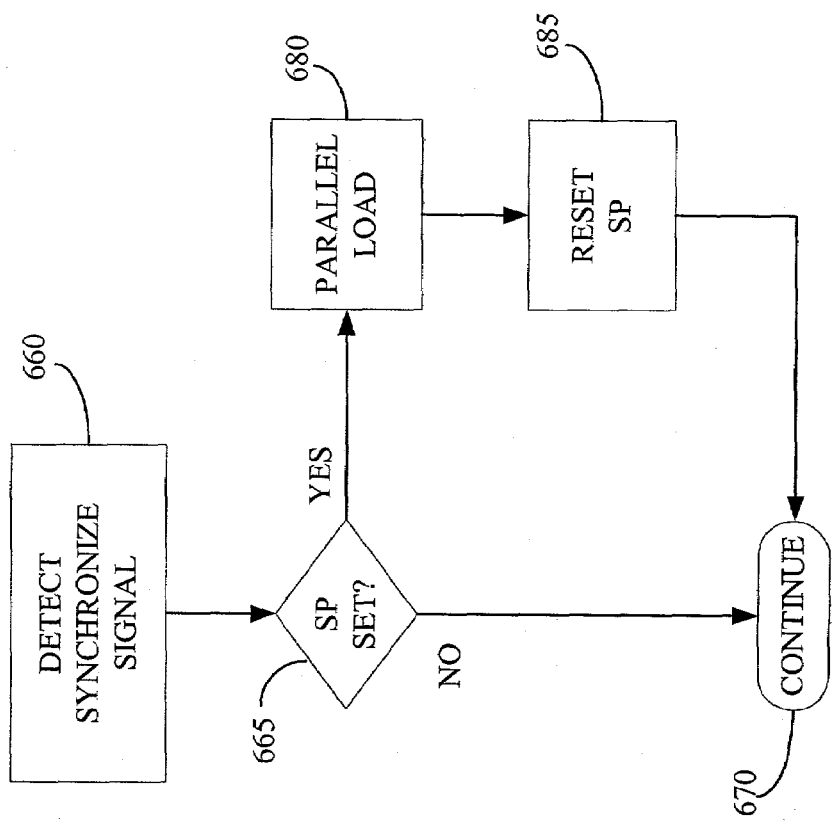
Figure 6B:
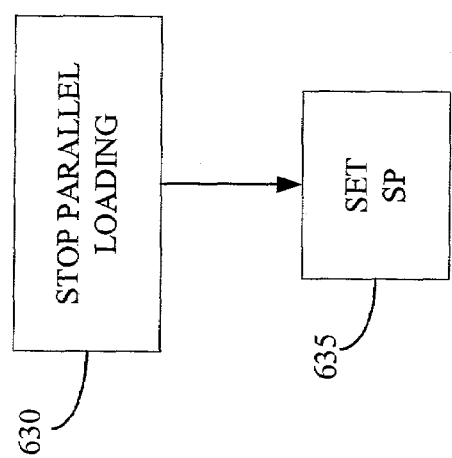

Referring now to FIG. 6B, a method of placing (at 625) one or more of the plurality of ASICs 500(1–a) in the wait mode is shown. In one embodiment, the ASIC controller 550 may stop (at 630) the parallel loading of data from the serial data register 530 to the configuration register 510. The ASIC logic 512 in the ASICs 500(1–a) may continue to operate using the configuration data currently contained in the configuration registers 510. The ASIC controller 550 may also set (at 635) the logic element 565 to indicate that synchronization may be pending. Although the steps of stopping (at 630) the parallel loading and setting (at 635) the logic element 565 have been described as happening sequentially, it should be appreciated that these steps may occur in any order, or substantially simultaneously, without departing from the scope of the present invention.

Referring back to FIG. 6A, the system control board 115(1–2) may determine (at 645) whether it may be desirable to provide (at 610) portions of the configuration data to one or more additional registers which may be on one or more additional ASICs 500(1–a). If so, the system control boards 115(1–2) may provide (at 610) the configuration data to the controllers 330(1–2), 480 via the console bus 340, as described above. If not, and the configuration data has been provided (at 610) to substantially all the desired ASICs 500(1–a), the system control board 115(1–2) may broadcast (at 650) a synchronization signal. The synchronizers 350, 485 in the one or more ASICs 500(1–a) in the system 100 may use the synchronization signal to parallel load (at 655) the configuration data from the serial data registers 530 to the configuration registers 510 of the plurality of ASICs 500(1–a) at substantially the same time.

FIG. 6C shows a flow chart illustrating a method of updating the configuration register 510 in one of the plurality of ASICs 500(1–a) in response to detecting (at 660) the synchronization signal. The synchronizer 350, 485 may detect (at 660) the synchronization signal. If it is determined (at 665) that the logic element 565 has not been set, indicating that the one or more ASICs 500(1–a) may not be reconfigured and that parallel loading has not been stopped (at 630), the one or more ASICs 500(1–a) may continue (at 670) operation.

In one embodiment, if it is determined (at 665) that the logic element 565 has been set, indicating that the serial data register 530 contains portions of the configuration data and that parallel loading has been stopped (at 630), the configuration register 510 may parallel load (at 680) the portions of the configuration data from the serial data register 530. The logic element 565 may then be reset (at 685), and the one or more ASICs 500(1–a) may continue (at 670) operation. Although the steps of parallel loading (at 680) and resetting (at 685) the logic element have been described as happening sequentially, it should be appreciated that these steps may occur in any order, or substantially simultaneously, without departing from the scope of the present invention.

However, as discussed above, it may be desirable to provide a controlled abandon of the reconfiguration process. For example, an error may interrupt the reconfiguration process. For another example, a user may choose to abort the reconfiguration. In one embodiment, the user may enter a control-C keyboard interrupt to indicate that a controlled abandon may be desirable. In an alternative embodiment, the user may click on a button in a graphical user interface (GUI) to indicate that a controlled abandon may be desirable. The GUI may also query the user as to whether a controlled abandon may be desirable. Hereinafter, errors, operator-initiated aborts, or other conditions that may make a controlled abandon desirable are referred to as "events."

Figure 7:
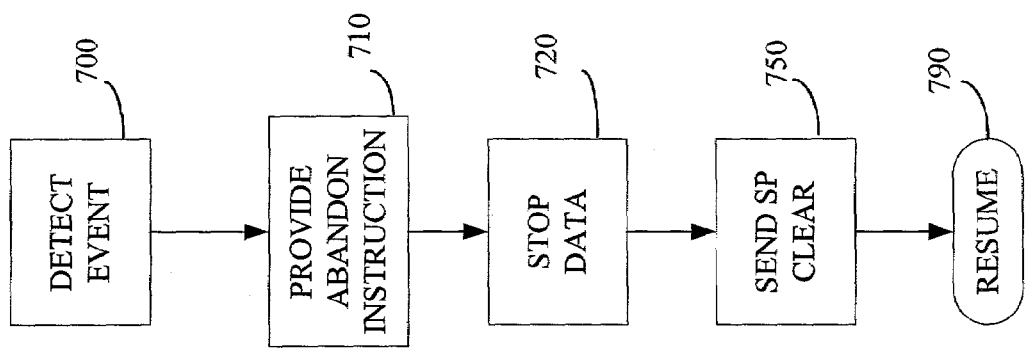
FIG. 7 shows a flow chart depicting a method of abandoning a configuration of the system shown in FIG. 1 in a controlled manner, in accordance with one embodiment of the present invention.

Referring now to FIG. 7, a flow diagram illustrating an exemplary method of performing a controlled abandon of the reconfiguration process is shown. In accordance with one embodiment of the present invention, the detectors 345, 482 in the controllers 330(1–2), 480 may detect (at 700) an event, such as the examples described above, that may make it desirable to abandon the reconfiguration process. The controllers 330(1–2), 480 may then provide (at 710) an abandon instruction to the ASIC controller 550. In response to receiving the abandon instruction, the ASIC controllers 550 may stop (at 720) the transfer of data into the serial data register 530 and may clear (at 750) the logic element (SP) 565. The ASIC controller 550 may also permit the configuration register 510 to resume (at 790) accessing the serial data register 530 at such a time as it may be desirable for the configuration register 510 to access the contents of the serial data register 530. Although the steps of stopping (at 720) the data transfer, clearing (at 750) the logic element 565, and resuming (at 790) access have been described as occurring sequentially, the instant invention is not so limited. In alternative embodiments, the steps of stopping (at 720) the data transfer, clearing (at 750) the logic element 565, and resuming (at 790) access may happen in any desirable order or substantially simultaneously.

Although the discussion above describes a process of abandoning a dynamic reconfiguration, it should be appreciated that, in alternative embodiments, the process described herein may be equally useful for abandoning other tasks. For example, two data arbiter ASICs that steer data through the centerplane 120 (se FIG. 1), such as that in Sun's Sun Fire® high-end server system, may use a plurality of free-running timers to synchronize various tasks. Data may be provided to the free-running timers (not shown) in a serial manner and a signal may then be provided so that the free-running timers may be started substantially simultaneously. However, it may be desirable to abandon the process substantially before the data has been provided to the free-running timers.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
    setting at least one of a plurality of logic elements associated with at least one of a plurality of first registers, wherein the plurality of first registers are adapted to access data stored in a plurality of second registers at substantially the same time when the plurality of logic elements are set, wherein accessing the data stored in the plurality of second registers comprises accessing the data stored in the plurality of second registers in response to a synchronization signal, and wherein setting the logic element comprises stopping the at least one of the plurality of first registers from accessing a corresponding second register; and
    resetting the plurality of logic elements before the plurality of first registers access the data stored in the plurality of second registers.

2. The method of claim 1, further comprising detecting an event before the plurality of first registers access the data stored in the plurality of second registers.

3. The method of claim 2, wherein detecting the event comprises detecting an error.

4. The method of claim 2, wherein detecting the event comprises detecting an operator-initiated abort.

5. The method of claim 4, wherein detecting the operator-initiated abort comprises detecting a keyboard sequence indicating the operator-initiated abort.

6. The method of claim 4, wherein detecting the operator-initiated abort comprises detecting a graphical user interface (GUI) action indicating the operator-initiated abort.

7. The method of claim 4, wherein resetting the logic element comprises resetting the plurality of logic elements in response to detecting the event.

8. The method of claim 7, further comprising allowing the plurality of first registers to access data stored in the plurality of second registers in response to resetting the logic elements.

9. An apparatus, comprising:
    a plurality of serial registers;
    a plurality of logic elements associated with the serial registers;
    a plurality of parallel registers, wherein the parallel registers are adapted to access the plurality of serial registers at substantially the same time in response to a synchronization signal when the associated logic element is set; and
    a controller adapted to reset the logic element in response to detecting an event, wherein the controller is adapted to reset the logic element in response to detecting the event before the parallel registers access the serial registers.

10. The apparatus of claim 9, wherein the event is an error.

11. The apparatus of claim 9, wherein the event is an operator-initiated abort.

12. The apparatus of claim 11, wherein the operator-initiated abort is a keyboard sequence indicating the operator-initiated abort.

13. The apparatus of claim 11, wherein the operator-initiated abort is a GUI action indicating the operator-initiated abort.

14. The apparatus of claim 9, further comprising an instruction register.

15. The apparatus of claim 14, wherein the controller is adapted to provide at least one instruction to the instruction register.

16. The apparatus of claim 15, wherein the controller is adapted to provide the at least one instruction to stop the parallel registers from accessing the serial registers until the synchronization signal is detected.

17. The apparatus of claim 16, wherein the controller is adapted to provide the at least one instruction to reset the logic element in response to detecting the event.

18. The apparatus of claim 14, wherein the parallel registers use the provided data to configure the associated ASICs.

19. The apparatus of claim 9, wherein the plurality of parallel registers are associated with a plurality of application specific integrated circuits (ASICs).

20. The apparatus of claim 11, wherein a portion of the serial registers are arranged in series in a ring.

21. A system, comprising:
a plurality of serial registers;
a plurality of logic elements associated with the serial registers;
a first controller adapted to provide data to the serial registers via a bus;
a second controller adapted to set at least one of the logic elements in response to data being provided to at least one associated serial register;
a plurality of parallel registers coupled to the serial registers, wherein the parallel registers are adapted to access the data in the serial registers at substantially the same time in response to receiving a synchronization signal; and
a detector adapted to detect an event substantially before the parallel registers access the data stored in the serial registers, wherein the detector is adapted to instruct the second controller to reset the logic elements in response to detecting the event.

22. The apparatus of claim 21, wherein the detector is adapted to instruct the second controller to reset the logic elements in response to detecting the event substantially before the parallel registers access the serial registers.

23. The system of claim 22, further comprising a plurality of system assets, wherein a second controller uses the data in at least one of the parallel registers to configure a portion of the system assets into at least one domain in the system.

24. The system of claim 23, wherein the system is adapted to access the data in at least one of the parallel registers to determine the allowed intra-and inter-domain communication pathways for the at least one domain.

25. The system of claim 21, wherein the bus is a serial bus that conforms to the IEEE Standard 1149.1, entitled "Standard test access port and boundary scan architecture."

26. The system of claim 21, wherein the bus is an Inter-IC (12C) serial bus.

27. The system of claim 21, wherein the bus is a parallel bus.

28. A method, comprising:
setting at least one of a plurality of logic elements associated with at least one of a plurality of first registers, wherein the plurality of first registers are adapted to access data stored in a plurality of second registers at substantially the same time when the plurality of logic elements are set; an
resetting the plurality of logic elements before the plurality of first registers access the data stored in the plurality of second registers; and
detecting an event before the plurality of first registers access the data stored in the plurality of second registers, wherein detecting the event comprises detecting an operator-initiated abort, and wherein detecting the operator-initiated abort comprises detecting a graphical user interface (GUI) action indicating the operator-initiated abort.

29. A method, comprising:
setting at least one of a plurality of logic elements associated with at least one of a plurality of first registers, wherein the plurality of first registers are adapted to access data stored in a plurality of second registers at substantially the same time when the plurality of logic elements are set;
detecting an event before the plurality of first registers access the data stored in the plurality of second registers, wherein detecting the event comprises detecting an operator-initiated abort;
resetting the plurality of logic elements before the plurality of first registers access the data stored in the plurality of second registers, wherein resetting the logic element comprises resetting the plurality of logic elements in response to detecting the event; and
allowing the plurality of first registers to access data stored in the plurality of second registers in response to resetting the logic elements.

30. An apparatus, comprising:
a plurality of serial registers;
a plurality of logic elements associated with the serial registers;
a plurality of parallel registers, wherein the parallel registers are adapted to access the plurality of serial registers at substantially the same time in response to a synchronization signal when the associated logic element is set; and
a controller adapted to reset the logic element in response to detecting an event, wherein the event is an operator-initiated abort, and wherein the operator-initiated abort is a GUI action indicating the operator-initiated abort.

31. An apparatus, comprising:
a plurality of serial registers;
a plurality of logic elements associated with the serial registers;
a plurality of parallel registers, wherein the parallel registers are adapted to access the plurality of serial registers at substantially the same time in response to a synchronization signal when the associated logic element is set;
a controller adapted to reset the logic element in response to detecting an event; and
an instruction register, an instruction register, wherein the controller is adapted to provide at least one instruction to the instruction register;
wherein the controller is adapted to provide the at least one instruction to stop the parallel registers from accessing the serial registers until the synchronization signal is detected.

* * * * *